Figure 1:
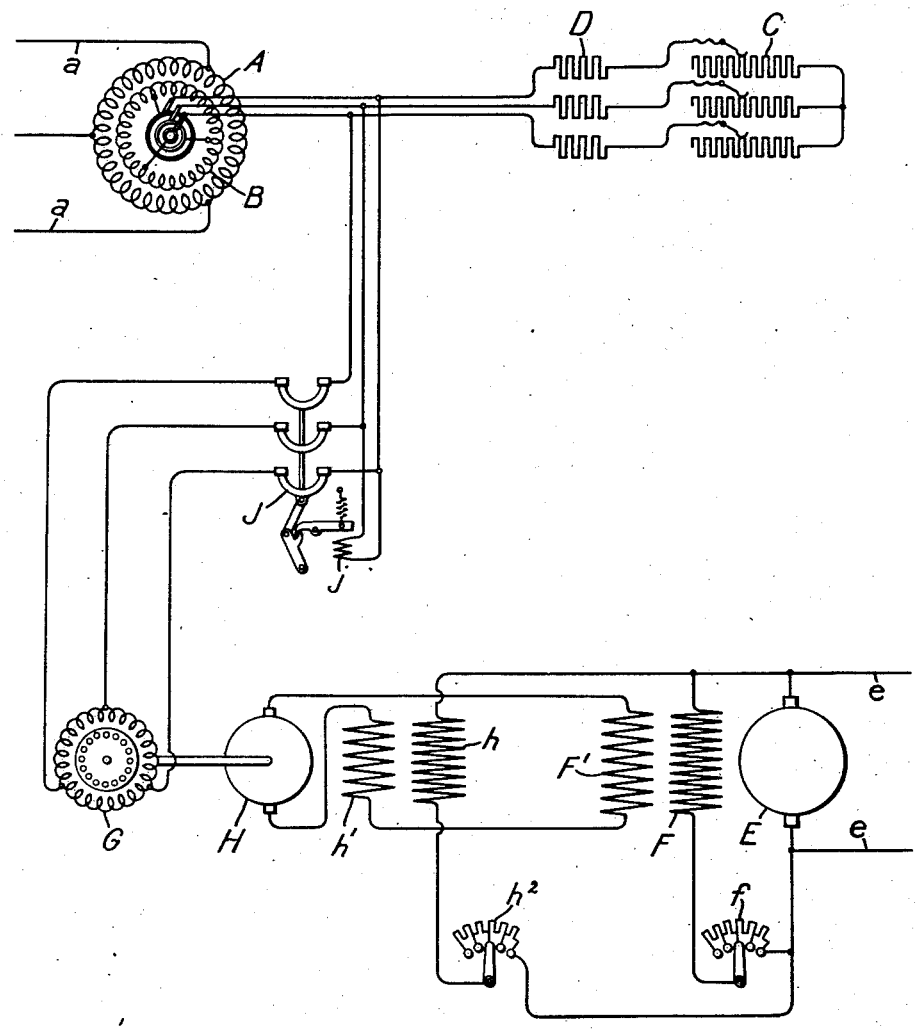

K. A. PAULY.
SYSTEM OF CONTROL.
APPLICATION FILED APR. 19, 1910.

1,026,364.

Patented May 14, 1912.
2 SHEETS—SHEET 1.

WITNESSES:
George W. Tilden
J. Ellis Ele

INVENTOR.
KARL A. PAULY.
BY Allen G. Davis
HIS ATTORNEY.

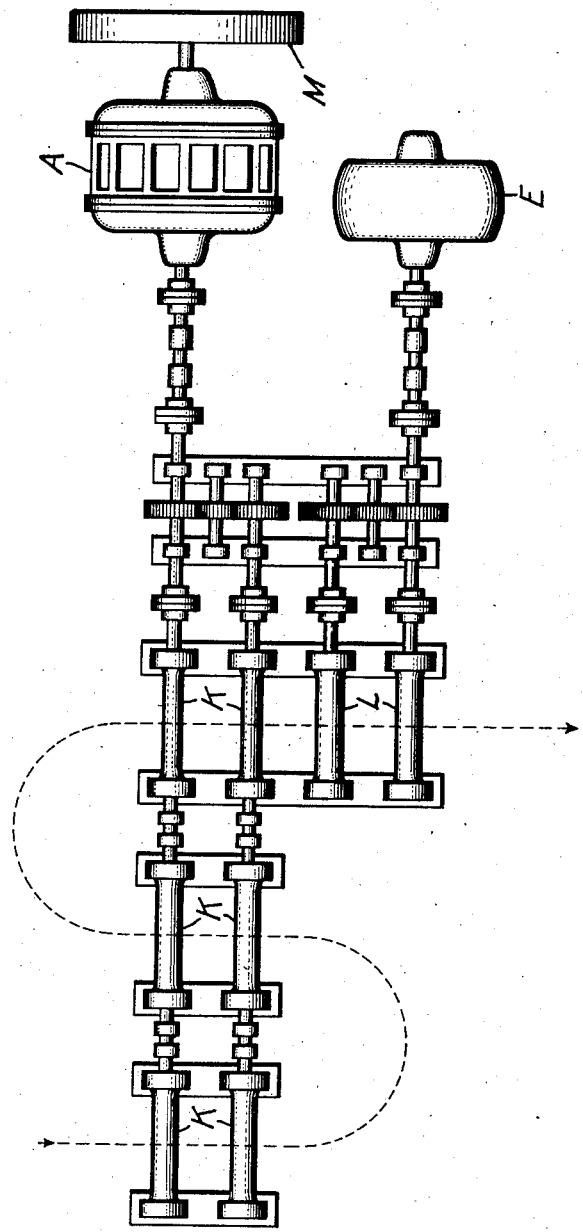

UNITED STATES PATENT OFFICE.

KARL A. PAULY, OF SCHENECTADY, NEW YORK, ASSIGNOR TO GENERAL ELECTRIC COMPANY, A CORPORATION OF NEW YORK.

SYSTEM OF CONTROL.

1,026,364.

Specification of Letters Patent. Patented May 14, 1912.

Application filed April 19, 1910. Serial No. 556,337.

*To all whom it may concern:*

Be it known that I, KARL A. PAULY, a citizen of the United States, residing at Schenectady, county of Schenectady, State of New York, have invented certain new and useful Improvements in Systems of Control, of which the following is a specification.

My invention relates to the control of dynamo electric machines, and has for its object the control of the field of such machines when used in conjunction with alternating current motors.

My invention is particularly applicable to the speed control of direct current motors used in conjunction with, but not mechanically connected to, alternating current motors.

For driving rolling mills induction motors are particularly suitable because of their ruggedness and freedom from commutation troubles, but it is often desirable to adjust the speed of the finishing stands for different kinds of work, and for speed adjustment a direct current motor is better adapted than an induction motor. If, however, a direct current motor is employed for driving the finishing stand while the rest of the rolls are driven by induction motors, trouble may arise with varying load, due to relative speed variations between the induction motors and the direct current motors, which may produce looping or buckling of the steel which is being rolled. Induction motor driven rolling mills are ordinarily provided with fly-wheels to reduce the load fluctuations, which also reduce the speed variations, but, in order to reduce the peak of the load to a minimum without using a fly-wheel of excessive weight, it is essential that the induction motor should drop somewhat in speed as the load comes on. In order to prevent the steel from buckling as it passes to the finishing stand, I provide means responsive to speed variations of the induction motor for varying the speed of the direct current motor so as to maintain a proportionality of speed between the two.

My invention will best be understood by reference to the accompanying drawings, in which—

Figure 1 shows diagrammatically a control system arranged in accordance with my invention, and Fig. 2 shows diagrammatically a rolling mill of a type to which my invention is applicable.

In Fig. 1, A represents the stator or primary member of an induction motor supplied from the three-phase lines. B represents the rotor or secondary member which is provided with collector rings. Through these rings the rotor may be connected to a starting resistance. C. D is a small resistance which is left permanently in the rotor circuit. E represents the armature of a direct current dynamo electric machine or motor which is mechanically independent of the induction motor and which is supplied with current from the direct current mains $e$ $e$. F represents a field winding of the direct current motor which I have shown as shunt connected and provided with a rheostat $f$ by means of which the speed of the motor may be adjusted. $F^1$ represents a second field winding for the motor, the current in which is varied so as to vary the motor field strength and the motor speed in accordance with variations in the speed of the main induction motor. For varying the current in the field winding $F^1$ many different arrangements may be employed. In the particular embodiment shown in the drawing I employ rotary transforming apparatus consisting of an auxiliary induction motor G and an auxiliary direct current generator H. This auxiliary generator has its armature connected to the field winding $F^1$ of the direct current motor and has its field winding or windings connected in any suitable way adapted to give the desired voltage characteristic to the machine. I have shown a winding $h$ supplied from the direct current mains $e$ $e$ and a compounding winding $h^1$ connected in series with the armature H. A rheostat $h^2$ may be used to adjust the strength of the winding $h$.

With the main induction motor up to speed the secondary circuit is closed through the resistance D and the auxiliary induction motor G is connected in parallel to this resistance. The frequency of the alternating current supplied to the primary winding of this auxiliary motor G depends upon the slip of the main motor and, consequently, its speed varies directly with the slip of the main motor. Therefore, if the load on the main motor increases and the slip increases accordingly, the speed and voltage of the auxiliary generator H increase, increasing the current in the winding $F^1$ and thereby strengthening the field of the direct current motor E, so that the speed of the direct current motor is decreased. By properly proportioning the windings of the direct current motor and of the auxiliary direct current generator, proportionality between the speeds of the main induction motor and direct current motor may be maintained.

If the auxiliary induction motor and direct current generator are designed to operate at efficient speeds for ordinary amounts of slip of the main induction motor, it is evident that speed limiting means should be provided for this motor generator set in order to prevent excessive speed in case of abnormal slip in the main motor such as would occur, for instance, if the current in the main motor were thrown off and then were thrown on again after the speed of the main motor had been greatly reduced. As a speed limiting device I have indicated a circuit breaker J in the connection from the auxiliary motor G to the secondary of the main motor. This circuit breaker is provided with a tripping coil $j$ connected in shunt to one phase of the secondary of the main motor. The voltage on the terminals of this tripping coil rises with an increase in slip of the main motor. Consequently, if the slip of the main motor becomes abnormal the circuit breaker J will be tripped.

The coil $j$ should be of comparatively high resistance and low reactance so as not to be greatly affected by change of frequency, which, if the coil were of high reactance and low resistance, would nearly neutralize the change in voltage.

In Fig. 2 I have shown, somewhat diagrammatically, a plan view of a rolling mill of a type to which my invention is applicable. The induction motor A drives the rolls K through which the steel is passed as indicated by the dotted line and in the direction shown by the arrow heads. The motor is provided with the usual fly-wheel M. L represents the finishing rolls which are driven by the direct current motor E. These rolls are mechanically independent of the rolls K, but by means of my invention, while the speed of these rolls may be adjusted, it varies automatically with the variation of the speed of the rolls K.

I do not desire to limit myself to the particular connections and arrangement of the parts shown and described, since many modifications therein will be obvious to those skilled in the art and I aim, in the appended claims, to cover all modifications which are within the scope of my invention.

What I claim as new and desire to secure by Letters Patent of the United States, is,—

1. In combination, an induction motor, a direct current motor mechanically independent thereof, and means mechanically independent of said motors and responsive to speed variations in the induction motor for varying the field strength of the direct current motor to maintain a proportionality between the speeds of said motors.

2. In combination, an induction motor, a direct current motor mechanically independent thereof, and means mechanically independent of said motors for maintaining a proportionality between the speeds of said motors comprising an electrically operated apparatus responsive to speed variations in the induction motor and controlling the speed of the direct current motor.

3. In combination, an induction motor, a direct current motor mechanically independent thereof, and electrodynamic apparatus connected to a field winding of said direct current motor and supplied with current from the secondary member of said induction motor.

4. In combination, an induction motor, a direct current motor mechanically independent thereof, and rotary transforming apparatus connected on its alternating current side to the secondary member of the induction motor and on its direct current side to a field winding of the direct current motor.

5. In combination, an induction motor, a direct current motor mechanically independent thereof, and means for automatically increasing the field strength of the direct current motor upon a decrease in speed of the induction motor.

6. In combination, an induction motor, a direct current motor mechanically independent thereof, an auxiliary generator connected to a field winding of the direct current motor, and means for driving said generator at a speed varying directly with the slip of the induction motor.

7. In combination, an induction motor, a direct current motor mechanically independent thereof, an auxiliary direct current generator driven at a speed which increases when the speed of the induction motor decreases, and electrical connections from said generator to a field winding of the direct current motor.

8. In combination, an induction motor, a direct current motor mechanically independent thereof, an auxiliary generator connected to a field winding of the direct current motor, means for driving said generator at a speed varying directly with the slip of the induction motor, and means for automatically limiting the speed of said generator.

9. In combination, an induction motor, a direct current motor mechanically independent thereof, rotary transforming apparatus connected on its alternating current side to the secondary member of the induction motor and on its direct current side to a field winding of the direct current motor, and speed limiting means for said apparatus.

10. In combination, an induction motor, a direct current motor mechanically independent thereof, rotary transforming apparatus connected on its alternating current side to the secondary member of the induction motor and on its direct current side to a field winding of the direct current motor, a switch for disconnecting said apparatus from the induction motor secondary, and an electromagnet in circuit with said secondary controlling said switch.

11. In combination, two interrelated loads, an induction motor for driving one of said loads, a variable speed direct current motor for driving the other, and means responsive to speed variations in the induction motor for producing corresponding variations in the speed of the direct current motor.

12. In combination, an induction motor, a direct current dynamo electric machine, electrodynamic apparatus connected to a field winding of said direct current dynamo electric machine and supplied with current from the secondary member of said induction motor, and a source of direct current, independent of said electrodynamic apparatus, for supplying the armature of said dynamo electric machine.

13. In combination, an induction motor, a direct current dynamo electric machine, rotary transformer apparatus connected on its alternating current side to the secondary member of the induction motor and on its direct current side to a field winding of the direct current dynamo electric machine, and a source of direct current, independent of said rotary transformer appartus, for supplying the armature of said dynamo electric machine.

14. In combination, an induction motor, a direct current dynamo electric machine, means for automatically increasing the field strength of the direct current dynamo electric machine upon a decrease in speed of the induction motor, and a source of direct current, independent of said means, for supplying the armature of said dynamo electric machine.

15. In combination, an induction motor, a direct current dynamo electric machine, means mechanically independent of said motor responsive to speed variations in the induction motor for varying the field strength of the direct current dynamo electric machine, and a source of direct current, independent of said means, for supplying the armature of said dynamo electric machine.

In witness whereof, I have hereunto set my hand this 18th day of April, 1910.

KARL A. PAULY.

Witnesses:
 BENJAMIN B. HULL,
 HELEN ORFORD.